US 11,141,855 B2

(12) United States Patent
Ishikawa

(10) Patent No.: US 11,141,855 B2
(45) Date of Patent: Oct. 12, 2021

(54) ROBOT SYSTEM, METHOD OF CONTROLLING ROBOT ARM, RECORDING MEDIUM, AND METHOD OF MANUFACTURING AN ARTICLE

(71) Applicant: CANON KABUSHIKI KAISHA, Tokyo (JP)

(72) Inventor: Takahiro Ishikawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 332 days.

(21) Appl. No.: 16/241,148

(22) Filed: Jan. 7, 2019

(65) Prior Publication Data

US 2019/0217466 A1  Jul. 18, 2019

(30) Foreign Application Priority Data

Jan. 15, 2018  (JP) .............................. JP2018-004451
Nov. 16, 2018  (JP) .............................. JP2018-215392

(51) Int. Cl.
*B25J 9/10* (2006.01)
*B25J 19/02* (2006.01)
*B25J 13/08* (2006.01)
*B25J 9/12* (2006.01)
*G05B 19/42* (2006.01)

(52) U.S. Cl.
CPC ................ *B25J 9/102* (2013.01); *B25J 9/12* (2013.01); *B25J 13/089* (2013.01); *B25J 19/021* (2013.01); *G05B 19/42* (2013.01)

(58) Field of Classification Search
CPC ........ B25J 9/102; B25J 19/021; B25J 13/089; B25J 9/12; B25J 9/1656; G05B 19/42

USPC ........................................................ 700/253
See application file for complete search history.

(56) References Cited

U.S. PATENT DOCUMENTS

| 4,529,921 | A | * | 7/1985 | Moribe | ................ | G05B 19/425 318/567 |
| 9,348,331 | B2 | | 5/2016 | Ishikawa | | |
| 2012/0239192 | A1 | * | 9/2012 | Yamato | .................. | B25J 9/1682 700/250 |
| 2014/0236565 | A1 | * | 8/2014 | Kuwahara | .............. | B25J 9/1671 703/22 |
| 2015/0148956 | A1 | * | 5/2015 | Negishi | .................... | B25J 9/163 700/253 |
| 2017/0015004 | A1 | | 1/2017 | Osaka | | |

(Continued)

FOREIGN PATENT DOCUMENTS

| JP | 8-25260 | | 1/1996 |
| JP | 2017177279 | A * | 10/2017 |
| JP | 2018020430 | A * | 2/2018 |

*Primary Examiner* — Jaime Figueroa
(74) *Attorney, Agent, or Firm* — Venable LLP

(57) ABSTRACT

A robot system includes a robot arm, and a controller configured to control posture of the robot arm. The controller configured to obtain a first teaching point, and first data on posture of the robot arm determined when the first teaching point is created. The controller configured to move the robot arm in accordance with the first teaching point in a state where the robot arm is supporting the workpiece or nothing, and obtain second data on posture of the robot arm determined when the robot arm has been moved in accordance with the first teaching point. The controller configured to create a second teaching point by correcting the first teaching point based on a difference between the first data and the second data.

14 Claims, 11 Drawing Sheets

(56) References Cited

U.S. PATENT DOCUMENTS

| | | | | |
|---|---|---|---|---|
| 2017/0203434 A1* | 7/2017 | Ueda | ............ | B25J 13/085 |
| 2017/0361464 A1* | 12/2017 | Sasaki | ............ | B25J 19/023 |
| 2018/0021949 A1* | 1/2018 | Miura | ............ | B25J 9/1633 |
| | | | | 700/250 |
| 2018/0036882 A1* | 2/2018 | Kimura | ............ | B25J 9/1664 |
| 2018/0345493 A1* | 12/2018 | Kokubo | ............ | B25J 9/1653 |

* cited by examiner

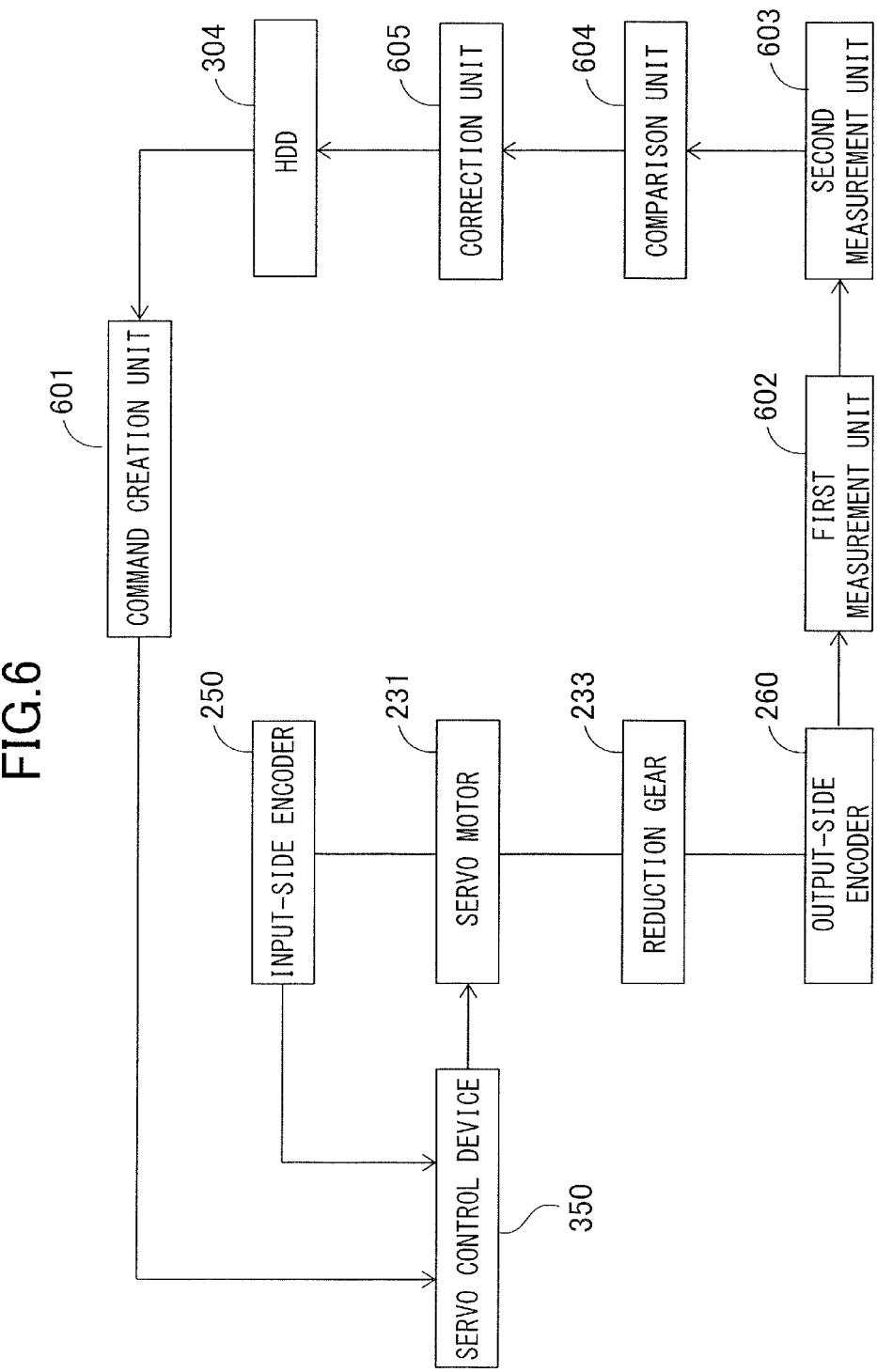

ROBOT SYSTEM, METHOD OF CONTROLLING ROBOT ARM, RECORDING MEDIUM, AND METHOD OF MANUFACTURING AN ARTICLE

BACKGROUND OF THE INVENTION

Field of the Invention

The present invention relates to a robot system, a method of controlling a robot arm, a recording medium, and a method of manufacturing an article.

Description of the Related Art

Industrial robots to perform various types of work are widely used in factories. Most of the industrial robots are operated by using teaching playback method as a control method. The teaching playback method involves a teaching operation and a playback operation. In the teaching operation, an operator operates an operating device such as a teaching pendant, and positions a distal end of a robot arm at a desired teaching position. Then the operator causes a memory of a robot controller to store positional information (i.e. teaching point information) of joints of the robot arm positioned at the teaching position. In the playback operation, the teaching point information stored in the memory is read, and the joints of the robot arm are servo-controlled in accordance with the teaching point information which has been read.

When the robot arm is taught, a pair of jigs made with high accuracy is used to accurately position the distal end of the robot arm. An operator operates the teaching pendant, and causes the distal end of the robot arm to support one jig of the pair, and causes the robot arm to fit the one jig onto the other jig placed at a target position. In this manner, the operator determines teaching points of the robot arm, while watching the robot arm. However, this method increases man-hours. Thus, there is also proposed a method in which a camera is mounted on the robot arm to automatically teach the robot arm.

In general, each joint of the robot arm is provided with a reduction gear. The reduction gear has stiffness which is lower than that of links of the robot arm. Thus, when the reduction gear disposed in each joint of the robot arm deforms, the position of the distal end of the robot arm may be displaced.

Japanese Patent Application Publication No. H8-025260 proposes a method to correct an indicated angle of each joint. Specifically, the method detects a torque of a motor which drives a corresponding joint, from a value of current which flows in the motor; calculates the amount of deformation of each joint by using the torque and a spring constant of the reduction gear; and corrects the indicated angle of each joint by using the amount of deformation of each joint.

However, although Japanese Patent Application Publication No. H8-025260 describes the method in which the amount of deformation of each joint of the robot arm is calculated by using the spring constant of the reduction gear, the spring constant of the reduction gear changes, depending on force applied to the reduction gear. For this reason, it has been difficult to correctly calculate the amount of deformation of each joint of the robot arm.

When the robot arm is taught, the robot arm is required to support a tool which is used for the teaching. For example, the tool is a jig or a camera, both having weight. However, when the robot arm is moved so that the robot performs actual work such as assembly work or conveyance work, the robot arm does not support the tool. Thus, the force applied to the distal end of the robot arm is different from the force applied to the distal end of the robot arm when the robot arm is taught. For example, in a case where a hand is attached to the distal end of the robot arm, the force applied to the distal end of the robot arm varies depending on whether the hand holds a workpiece. In addition, when the hand holds a workpiece, the force applied to the distal end of the robot arm varies depending on the weight of the workpiece. Thus, since the force applied to the distal end of the robot arm significantly varies depending on conditions, it has been difficult for the robot arm to perform work accurately.

SUMMARY OF THE INVENTION

According to a first aspect of the present invention, a robot system includes a robot arm, and a controller configured to control posture of the robot arm. The controller configured to obtain a first teaching point created in a state where the robot arm is supporting a tool other than a workpiece, and first data on posture of the robot arm determined when the first teaching point is created, move the robot arm in accordance with the first teaching point in a state where the robot arm is supporting the workpiece or nothing, and obtain second data on posture of the robot arm determined when the robot arm has been moved in accordance with the first teaching point, and create a second teaching point by correcting the first teaching point based on a difference between the first data and the second data.

According to a second aspect of the present invention, a method of controlling a robot arm includes obtaining a first teaching point created in a state where the robot arm is supporting a tool other than a workpiece, and first data on posture of the robot arm determined when the first teaching point is created, moving the robot arm in accordance with the first teaching point in a state where the robot arm is supporting the workpiece or nothing, and obtaining second data on posture of the robot arm determined when the robot arm has been moved in accordance with the first teaching point, and creating a second teaching point by correcting the first teaching point based on a difference between the first data and the second data.

According to a third aspect of the present invention, a method of using a robot arm and manufacturing an article in which a first workpiece is fitted on a second workpiece includes obtaining a first teaching point created in a state where the robot arm is supporting a tool other than a workpiece, and first data on posture of the robot arm determined when the first teaching point is created, moving the robot arm in accordance with the first teaching point in a state where the robot arm is supporting the workpiece, and obtaining second data on posture of the robot arm determined when the robot arm has been moved in accordance with the first teaching point, creating a second teaching point by correcting the first teaching point based on a difference between the first data and the second data, and moving the robot arm in accordance with the second teaching point, and fitting the first workpiece onto the second workpiece.

Further features of the present invention will become apparent from the following description of exemplary embodiments with reference to the attached drawings.

BRIEF DESCRIPTION OF THE DRAWINGS

FIG. 6 is a functional block diagram functionally illustrating the control system of the robot system of the first embodiment.

DESCRIPTION OF THE EMBODIMENTS

Hereinafter, some embodiments of the present invention will be described in detail with reference to the accompanying drawings.

First Embodiment

Figure 1:
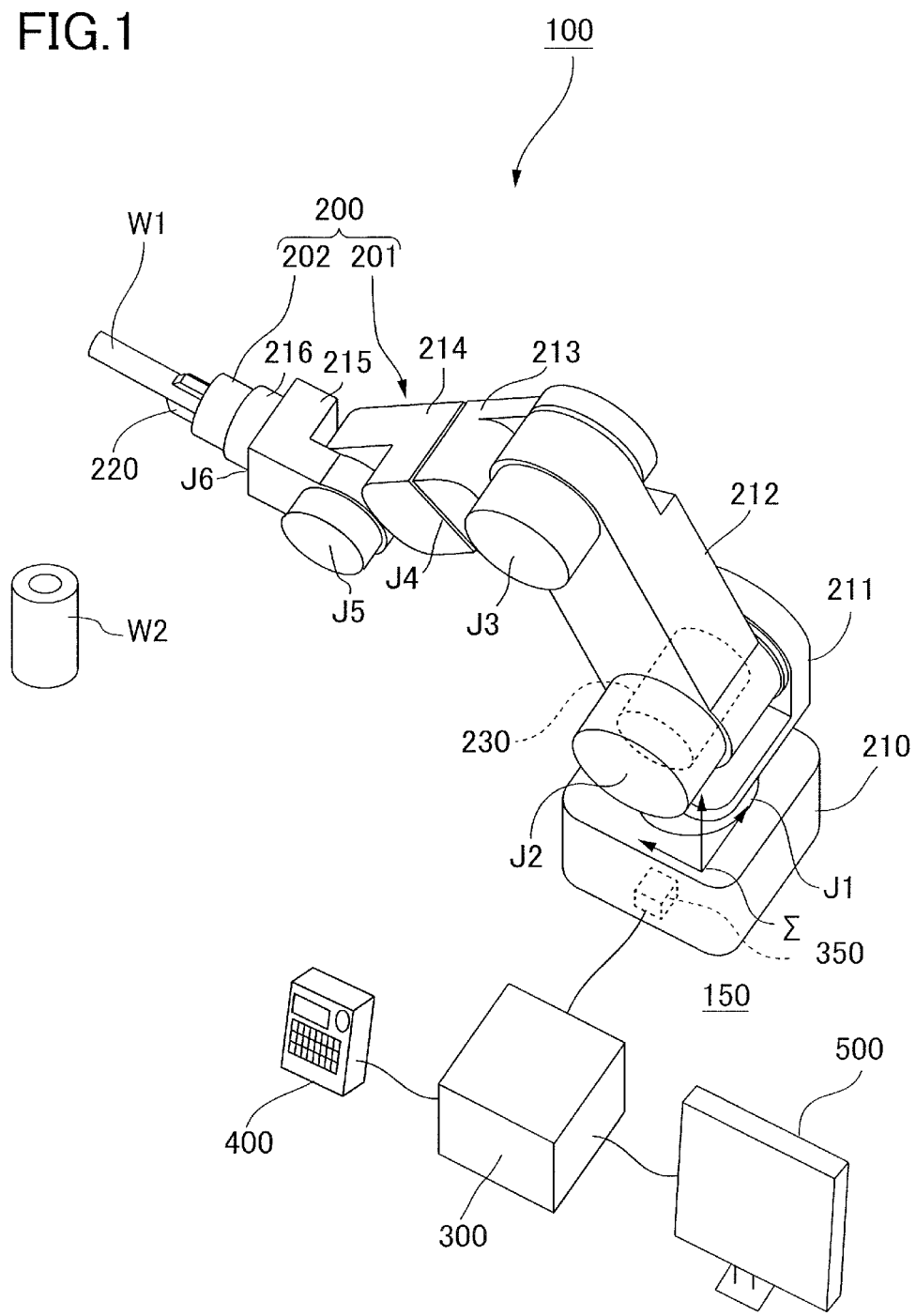
FIG. 1 is a perspective view schematically illustrating a robot system of a first embodiment.

FIG. 1 is a perspective view schematically illustrating a robot system 100 of a first embodiment. The robot system 100 includes a robot 200, a robot control device 300, a teaching pendant 400, and a display 500. The robot 200 is an industrial robot to perform work including assembly work. The robot control device 300 is one example of controllers, and serves also as a teaching device. The teaching pendant 400 is one example of operating devices, and the display 500 is one example of display devices. The robot 200, the teaching pendant 400, and the display 500 are connected to the robot control device 300, and send/receive signals to/from the robot control device 300. The robot 200 is disposed on an upper surface 150 of a base. The teaching pendant 400 is operated by an operator, and is used for instructions of operation for the robot 200 and the robot control device 300.

The robot 200 is a vertically articulated robot, and includes a robot arm 201 and a hand 202. The hand 202 is one example of end effectors, and attached to the distal end of the robot arm 201. The base end of the robot arm 201 is fixed to the upper surface 150 of the base. The hand 202 is a holding portion to hold an object, such as a part, a tool, a jig, or a camera.

The robot arm 201 includes a plurality of links 210 to 216 joined with one another via a plurality of (e.g. six) joints J1 to J6. Hereinafter, although the description will be made for a case where the joints of the robot arm 201 are rotary joints, the joints may be prismatic joints. In the following description, a position of a joint means a rotational position or an angle of the joint if the joint is a rotary joint, and means a translational position of the joint if the joint is a prismatic joint.

The robot arm 201 includes a plurality of driving mechanisms 230, each of which causes each of the joints J1 to J6 to rotate on a corresponding joint axis. With the rotation of the joints J1 to J6, the posture of the robot arm 201 can be changed. By changing the posture of the robot arm 201, the hand 202 disposed at the distal end of the robot arm 201 can be moved to a desired position.

The hand 202 has a plurality of fingers 220, and can hold a workpiece by moving the plurality of fingers 220. In the first embodiment, the robot 200 fits a first workpiece W1 onto a second workpiece W2. Thus, the hand 202 can hold the workpiece W1.

The robot control device 300 controls the posture of the robot arm 201. The posture of the robot arm 201 is determined by a position of the distal end of the robot arm 201 in work space, that is, by positions of the joints J1 to J6 of the robot arm 201. The position of the distal end of the robot arm 201 is expressed by three components indicating a position in translational directions and three components indicating a position in rotational directions. Here, the position of the distal end of the robot arm 201 is determined in a base coordinate system $\Sigma$ defined with respect to the base end of the robot arm 201, that is, with respect to the upper surface 150 of the base. In the robot control device 300, the distal end of the robot arm 201 is defined as a tool center point (TCP). The position of the distal end of the robot arm 201, that is, the position of the hand 202 can be positioned by indicating the position of the TCP in the base coordinate system $\Sigma$, by using the teaching pendant 400.

Here, although not illustrated in FIG. 1, a force sensor may be disposed between the robot arm 201 and the hand 202. In this case, the hand 202 is attached to the distal end of the robot arm 201 via the force sensor (not illustrated).

Hereinafter, a configuration of each of the joints J1 to J6 of the robot arm 201 will be described. Since the joints J1 to J6 have the same configuration in the first embodiment, only the joint J2 will be described, and the description of the other joints J1, and J3 to J6 will be omitted.

Figure 2:
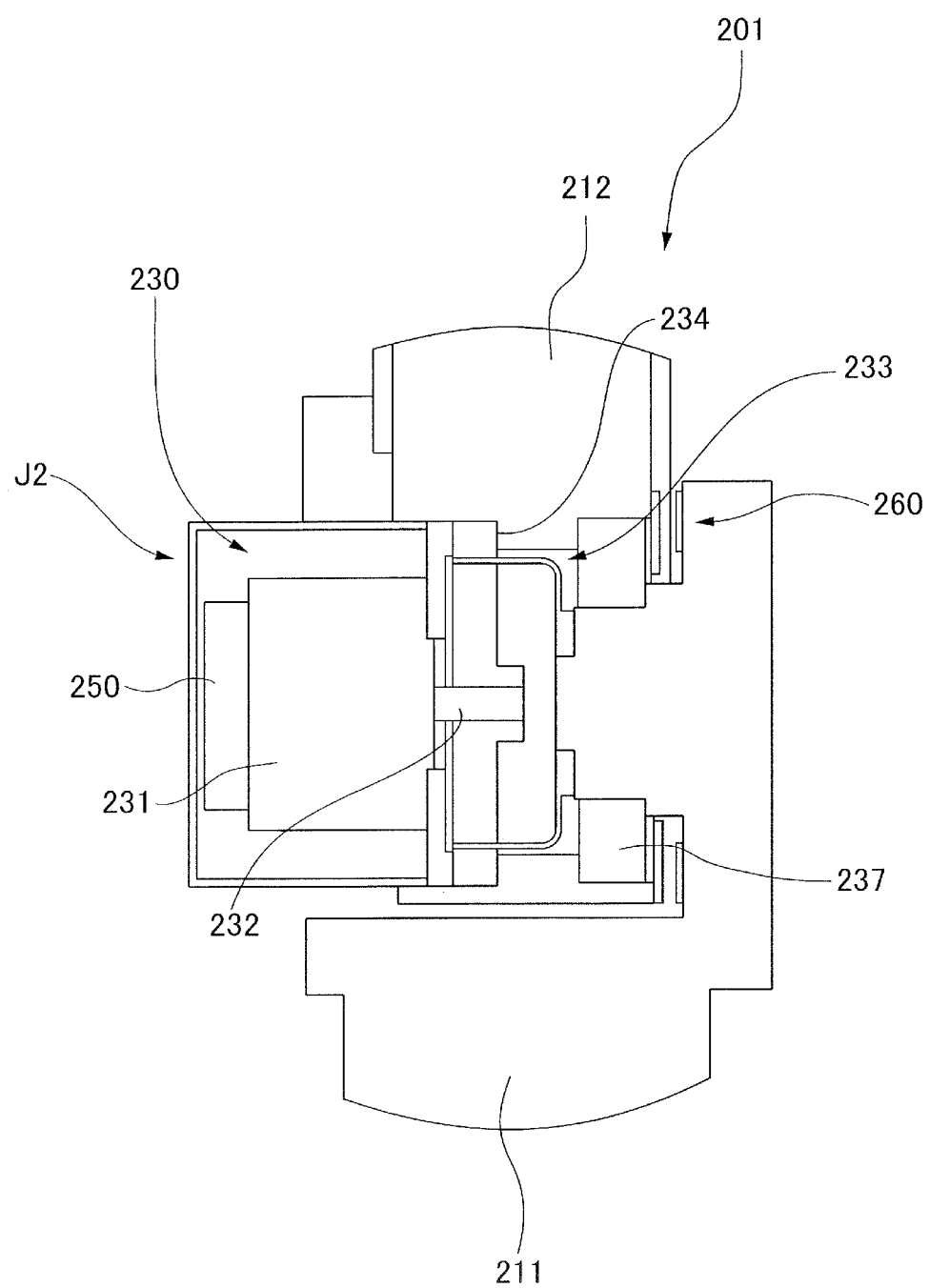
FIG. 2 is a schematic cross-sectional view illustrating a joint of a robot arm of the first embodiment.

FIG. 2 is a schematic cross-sectional view illustrating the joint J2 of the robot arm 201 of the first embodiment. As illustrated in FIG. 2, the joint J2 of the robot arm 201 includes the driving mechanism 230, an output-side encoder 260 which is one example of a first encoder, and an input-side encoder 250 which is one example of a second encoder. The driving mechanism 230 includes a servo motor 231, and a reduction gear 233. The reduction gear 233 reduces the speed of rotation of a rotary shaft 232 of the servo motor 231, and outputs the reduced speed of rotation. An output shaft 234 of the reduction gear 233 is joined with the link 212 for example. Thus, the link 212 is rotated relative to the link 211, by the driving force of the servo motor 231 via the reduction gear 233.

The servo motor 231 is an electric motor, such as a brushless DC motor or an AC servo motor; and is servo-controlled by a servo control device 350 illustrated in FIG. 1. Here, although the servo control device 350 is disposed in the robot arm 201 in FIG. 1, the location of the servo control device 350 is not limited to this. For example, the servo control device 350 may be disposed in the housing of the robot control device 300.

The reduction gear 233 may be a strain wave gearing; and reduces the rotational speed of the servo motor 231 at a reduction ratio of N (e.g. N=50), in order to move the joint J2. With this operation, the link 212 rotates relative to the link 211 on the joint J2. The rotation angle of the output shaft 234 of the reduction gear 233 is an angle of the joint J2.

The input-side encoder 250 and the output-side encoder 260 are optical or magnetic rotary encoders. The rotary encoders may be of an absolute system or an incremental system. The input-side encoder 250 is disposed on the input side with respect to the reduction gear 233, and outputs to the servo control device 350 a signal indicating an output value which is angle information of the rotary shaft 232 of the servo motor 231. The output-side encoder 260 is disposed on the output side with respect to the reduction gear 233, that is, between the link 211 and the link 212. The output-side encoder 260 outputs to the servo control device 350 a signal indicating a relative angle of the link 212 to the link 211, that is, an output value which is angle information of the joint J2.

Here, a crossed roller bearing 237 is disposed between the link 211 and the link 212, and thus the link 211 and the link 212 are rotatably joined with each other via the crossed roller bearing 237.

Figure 3:
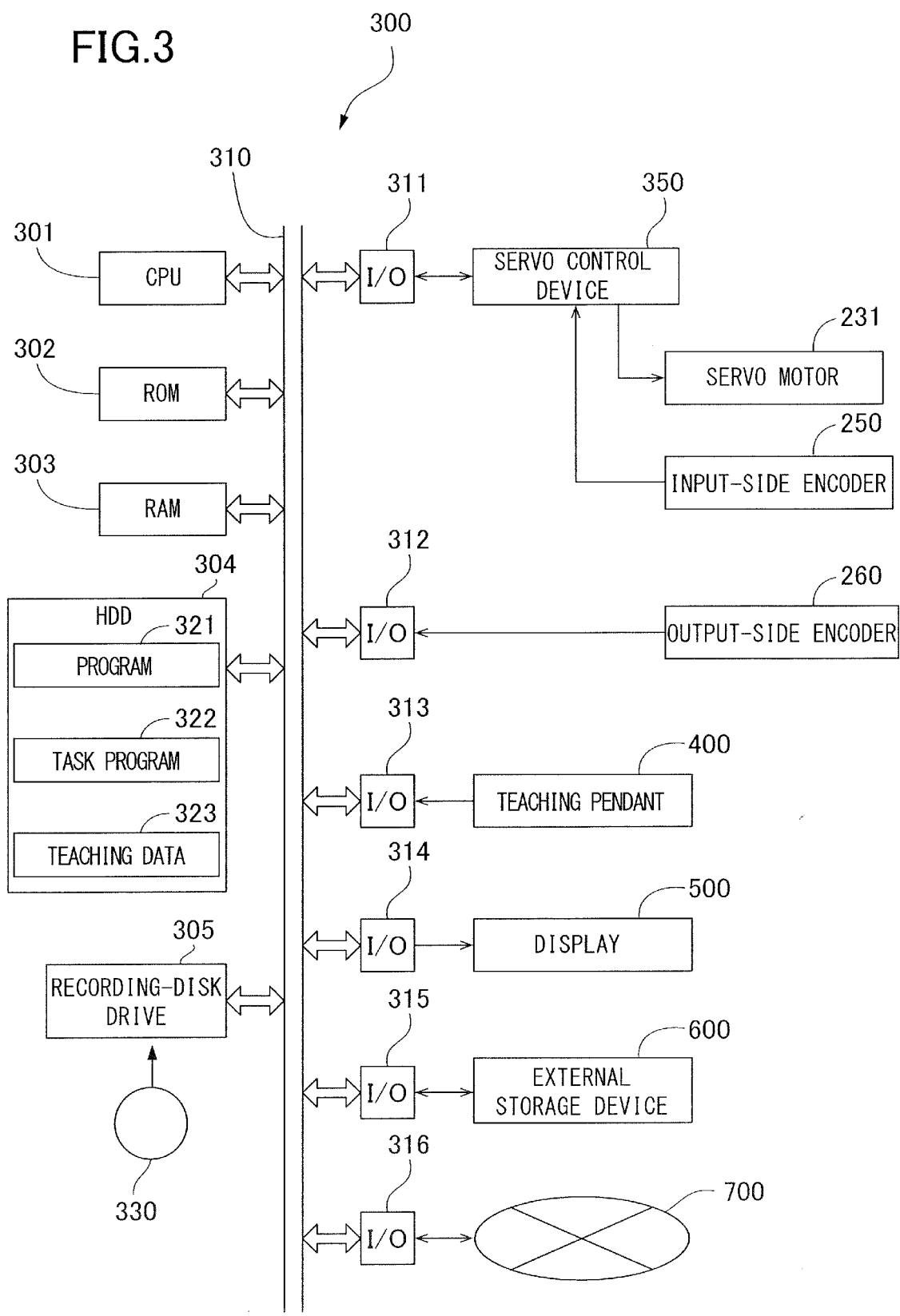
FIG. 3 is a block diagram illustrating a control system of the robot system of the first embodiment.

FIG. 3 is a block diagram illustrating a control system of the robot system of the first embodiment. The robot control device 300 is a computer. The robot control device 300 includes a central processing unit (CPU) 301, which is one example of processing units. In addition, the robot control device 300 includes, as examples of memory units, a read only memory (ROM) 302, a random access memory (RAM) 303, and a hard disk drive (HDD) 304. In addition, the robot control device 300 includes a recording-disk drive 305, input/output interfaces (I/O) 311 to 316, and the servo control device 350.

The CPU 301, the ROM 302, the RAM 303, the HDD 304, the recording-disk drive 305, and the I/O 311 to 316 are communicatively connected with each other via a bus 310. The I/O 311 is connected with the servo control device 350, and the I/O 312 is connected with the output-side encoder 260. The I/O 313 is connected with the teaching pendant 400, and the IVO 314 is connected with the display 500. The I/O 315 can be connected with an external storage device 600. The I/O 316 can be connected to a communication network 700.

The servo control device 350 is connected with the servo motor 231 and the input-side encoder 250 of each of the joints J1 to J6. Here, FIG. 3 illustrates the servo motor 231, the input-side encoder 250, and the output-side encoder 260 of a single joint, but the robot arm 201 has six joints in the first embodiment. Thus, there are six sets of the servo motor 231, the input-side encoder 250, and the output-side encoder 260, although not illustrated in FIG. 3.

The CPU 301 causes the servo control device 350 to control the servo motor 231 which drives each of the joints J1 to J6 of the robot arm 201, and thereby controls the motion of the robot arm 201. In addition, the CPU 301 controls the display 500 to cause the display 500 to display an image. The output-side encoder 260 outputs to the CPU 301 a signal corresponding to an output value which is a detection result indicating the angle information. The CPU 301 receives the signal corresponding to the output value, from the output-side encoder 260. In addition, the CPU 301 receives a signal indicating an instruction which is sent from the teaching pendant 400 by an operator operating the teaching pendant 400.

The HDD 304 stores a program 321 used for control and calculation, a task program 322, and teaching data 323. The recording-disk drive 305 can read various types of data and a program stored in a recording disk 330.

The program 321 causes the CPU 301 to perform later-described various types of calculation and control. The task program 322 is a text file written by using, for example, a robot language; and can be changed by an operator or a computer. In the task program 322, statements are written by using the robot language. For example, one statement causes the TCP to move linearly from a teaching point P1 to a teaching point P2. Numerical values of parameters of teaching points may be written in the task program 322, but in the first embodiment, the numerical values are written in another file other than the task program 322, and stored as teaching data 323 in the HDD 304, which is a storage unit. Thus, the teaching data 323 contains a plurality of pieces of teaching point information which causes the robot arm 201 to perform a series of operations, such as assembly work. Here, each of the teaching points is a target value for the TCP, and has three components (X, Y, Z) indicating a position in the translational directions with respect to the base coordinate system $\Sigma$, and three components (TX, TY, TZ) indicating a position in the rotational directions with respect to the base coordinate system $\Sigma$. Thus, each of the teaching points has six components (X, Y, Z, TX, TY, TZ).

The CPU 301 reads the task program 322; and creates pieces of trajectory data for the TCP, which connect teaching points. The trajectory data is created by using an interpolation method specified in the task program 322, such as linear interpolation or circular interpolation. For example, when the linear interpolation is used, the CPU 301 creates pieces of trajectory data which cause the TCP to move linearly.

The trajectory data is a group of pieces of data, each piece having six parameters and indicating a position of the TCP. Since the trajectory data is created every predetermined time (e.g. 1 ms), the trajectory data contains time information such as velocity and acceleration. The CPU 301 performs calculation based on inverse kinematics of robot, and converts each piece of the trajectory data to angle command values (position command values) indicating target values of angles (positions) of the joints J1 to J6. Furthermore, the CPU 301 converts the angle command values for the joints J1 to J6 to angle command values (position command values) indicating target values of rotation angles of the servo motors 231 disposed in the joints J1 to J6. Specifically, the CPU 301 multiplies the angle command values for the joints J1 to J6, by the reduction ratio of N of the reduction gear 233; and thereby calculates the angle command values for the servo motors 231 disposed in the joints J1 to J6.

The CPU 301 outputs the angle command values to the servo control device 350 every predetermined time. The angle command values are one example of command values for the servo motors 231 of the joints J1 to J6. The servo control device 350 controls current supplied to the servo motor 231, so that an angle detected by the input-side encoder 250, that is, an output value from the input-side encoder 250 becomes close to the angle command value for the servo motor 231. In this manner, the servo control device 350 performs feedback control so that a detection result by the input-side encoder 250 becomes close to the angle command value determined based on the teaching point information.

Hereinafter, a method of controlling the robot arm 201 will be described in detail. The control method of the first embodiment mainly includes a process to create the teaching data 323 and a process to correct the created teaching data 323. In the process to create the teaching data 323, an operator operates the teaching pendant 400, and causes the robot arm 201 to perform a series of operations necessary for predetermined work, such as assembly work or conveyance work. The operator operates the teaching pendant 400 while watching the robot arm 201, and sequentially determines a plurality of pieces of teaching point information (data).

Figure 4:
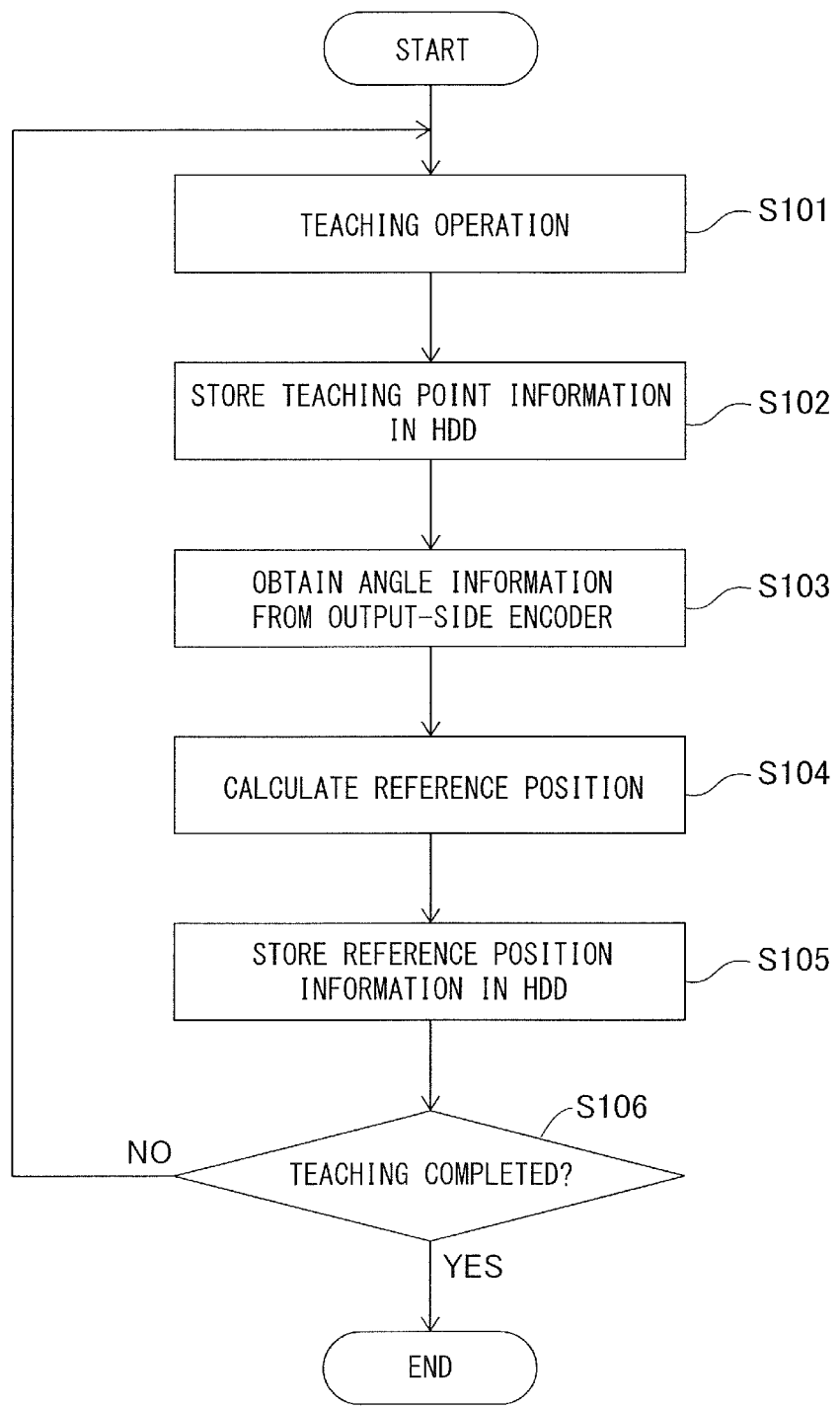
FIG. 4 is a flowchart for illustrating a control method for the robot arm, of the first embodiment.
Figure 5A:
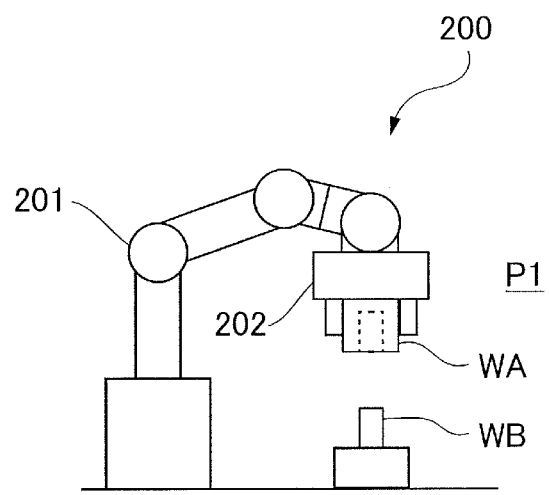
FIG. 5A is a diagram for illustrating an operation of the robot arm of the first embodiment.
Figure 5B:
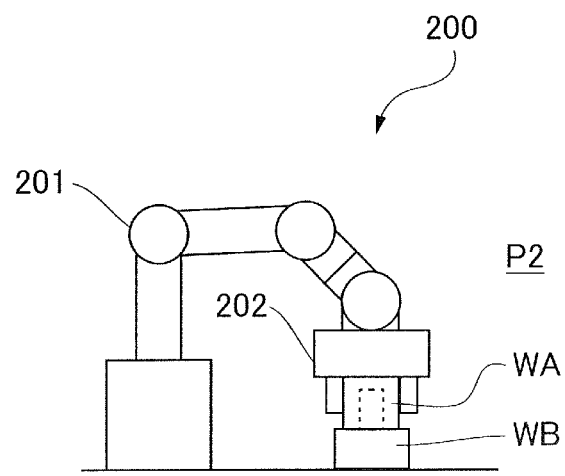
FIG. 5B is a diagram for illustrating an operation of the robot arm of the first embodiment.

Hereinafter, the process (teaching process) to create the teaching data 323 will be specifically described. FIG. 4 is a flowchart for illustrating the control method for the robot arm 201, of the first embodiment. FIGS. 5A and 5B are diagrams for illustrating operations of the robot arm 201. First, as illustrated in FIGS. 5A and 5B, a pair of teaching jigs WA and WB is provided. The teaching jigs WA and WB are one example of tools used for the teaching, and made with high accuracy. An operator causes the hand 202 to hold the teaching jig WA in a state where the teaching jig WA is positioned with respect to the hand 202, with high accuracy. The teaching jig WB is positioned in the base coordinate system Σ, with high accuracy. The teaching jig WA is fitted onto the teaching jig WB, so that the teaching jig WA is positioned with respect to the teaching jig WB with high accuracy. That is, when the operator causes the robot 200 to fit the teaching jig WA onto the teaching jig WB, the distal end of the robot arm 201 can be positioned in the base coordinate system Σ, with high accuracy. Here, if the distal end of the robot arm 201 does not have to be positioned with high accuracy, the operator may not cause the robot 200 to fit the teaching jig WA onto the teaching jig WB.

Hereinafter, the teaching performed in the state where the CPU 301 causes the hand 202 to hold the teaching jig WA will be described with reference to the flowchart of FIG. 4. Preferably, the teaching is performed in the state where the CPU 301 causes the hand 202 to hold the teaching jig WA, even for a teaching point (of the plurality of teaching points) where high teaching accuracy is not required. This is because the teaching jig WA may be displaced with respect to the hand 202.

The CPU 301 causes the robot arm 201 to perform the teaching operation (S101). That is, the CPU 301 follows an instruction from the teaching pendant 400 operated by an operator, and causes the robot arm 201 to move in the state where the CPU 301 causes the hand 202 to hold the teaching jig WA.

When the operator judges through visual check that the posture of the robot arm 201 is fixed, the operator operates the teaching pendant 400, and causes the teaching pendant 400 to send an instruction to fix the teaching point information, to the CPU 301. The CPU 301 follows the instruction from the teaching pendant 400, and fixes parameter values of the six components indicating the teaching point information. Specifically, the CPU 301 fixes the parameter values as command values which the CPU 301 has indicated to the servo control device 350 when receiving the instruction. When fixing the teaching point information, the CPU 301 causes the HDD 304, which is a storage unit, to store the teaching point information. (S102).

The command values indicated to the servo control device 350 are angle command values corresponding to angles of the servo motors 231. As a process to fix a teaching point, the CPU 301 converts the angle command values corresponding to angles of the servo motors 231, to angle command values for the joints. In addition, the CPU 301 performs calculation based on forward kinematics of robot, and converts the angle command values for the joints to command values indicating a position of the TCP. In this manner, the command values indicating the position of the TCP, that is, the teaching point information is fixed. Here, in the calculation based on forward kinematics, the calculation for deformation of the robot arm 201, that is, the calculation for deformation of the reduction gear 233 is not included.

The CPU 301 causes the robot arm 201 to keep the posture fixed when the teaching point information is fixed, and obtains output values indicating angle information of the joints J1 to J6, from the output-side encoders 260 disposed in the joints J1 to J6 (S103).

The CPU 301 determines an actual position of the distal end of the robot arm 201, as first data on the posture of the robot arm 201, by using the angle information of the joints J1 to J6, through calculation based on forward kinematics of robot (S104). The positional information (data) determined in Step S104 is a reference value used in a comparison operation performed later. Hereinafter, the positional information at the distal end of the robot arm 201 determined in Step S104 is referred to as reference position information. The reference position information contains three components indicating a position in the translational directions and three components indicating a position in the rotational directions.

As described above, in the first embodiment, the CPU 301 obtains detection results detected when the teaching point has been fixed, by the output-side encoders 260 disposed in the joints J1 to J6; and measures a reference position of the distal end of the robot arm 201 by using the detection results. Then the CPU 301 causes the HDD 304 to store the reference position information obtained in the measurement (S105).

Here, although the position of the distal end of the robot arm 201 is measured by using the plurality of output-side encoders 260 of the robot arm 201, the method of the measurement is not limited to this. For example, a laser displacement gauge, which is one example of measuring instruments, may be disposed around the robot arm 201. In this case, the CPU 301 measures the position of the distal end of the robot arm 201 by using the laser displacement gauge.

The reduction gear 233 disposed in each of the joints J1 to J6 of the robot arm 201 deforms due to self-weight of the robot 200 and weight of the teaching jig WA held by the hand 202. For this reason, the angle information obtained from each of the output-side encoders 260 contains displacement information caused by the deformation of the reduction gear 233. Thus, the position of the distal end of the robot arm 201 determined by using the angle information obtained from the output-side encoders 260 of the joints J1 to J6, through calculation based on forward kinematics of robot, has a value close to an actual value.

The CPU 301 determines whether the teaching is completed, that is, whether the plurality of pieces of teaching point information are all fixed (S106). If the teaching is not completed (S106: NO), then the CPU 301 returns to Step S101, and causes the robot arm 201 to perform the next teaching operation. By repeating the steps S101 to S106, the plurality of pieces of teaching point information, and the reference position information associated with the teaching points are obtained.

One example to teach assembly work to the robot 200 will be described. A teaching point P1 of FIG. 5A may be with low accuracy. A teaching point P2 of FIG. 5B is positioned at a position at which the workpiece W1 is fitted onto the workpiece W2, and thus is required to have high accuracy. The CPU 301 follows an instruction from the teaching pendant 400 operated by an operator, and causes the distal end of the robot arm 201 to move to the target teaching point P1 in the state where the CPU 301 causes the hand 202 to hold the teaching jig WA, as illustrated in FIG. 5A. When the posture of the robot arm 201 is fixed, the CPU 301 follows an instruction from the teaching pendant 400 operated by the operator, and fixes information on the teaching point P1 by using information indicated to the servo control device 350 when the posture of the robot arm 201 is fixed.

Then the CPU 301 follows an instruction from the teaching pendant 400 operated by the operator, and causes the distal end of the robot arm 201 to move to the target teaching point P2 in the state where the CPU 301 causes the hand 202 to hold the teaching jig WA, as illustrated in FIG. 5B. When the teaching jig WA is fitted on the teaching jig WB, the distal end of the robot arm 201 is positioned at a predetermined position, with high accuracy. When the posture of the robot arm 201 is fixed, the CPU 301 follows an instruction from the teaching pendant 400 operated by the operator, and fixes information on the teaching point P2 by using information indicated to the servo control device 350 when the posture of the robot arm 201 is fixed. In this manner, the plurality of teaching points P1, P2, . . . corresponding to a series of operations are sequentially determined by using a method in which teaching points are determined by using the teaching jigs WA and WB, or a method in which teaching points are determined without using the teaching jigs WA and WB. The information on the teaching points P1, P2, . . . determined in this manner is sequentially stored in the HDD 304, as the teaching data 323.

Here, although the description has been made for the case where the teaching jig WA is supported by the robot arm 201, by causing the hand 202 to hold the teaching jig WA, the present disclosure is not limited to this. For example, the hand 202 may hold a camera which serves as a tool used for the teaching, and the robot arm 201 may be taught with the camera. In addition, although the description has been made for the case where the tool used for the teaching is held by the hand 202, the tool used for the teaching may be directly or indirectly attached to the distal end of the robot arm 201. In either case, the robot arm 201 supports the tool used for the teaching. If a camera is used as the tool used for the teaching, the CPU 301 may automatically perform the teaching in accordance with the program 321.

By the way, when the robot 200 actually works, the robot arm 201 does not support the teaching jig WA. In the actual work performed by the robot 200, the hand 202 holds nothing or a workpiece W1 other than the teaching jig WA, depending on scenes in the work. That is, the robot arm 201 holds nothing or the workpiece W1. As a result, the load applied to the distal end of the robot arm 201 changes from the load applied when the teaching is performed in the steps S101 to S106. For this reason, the amount of deformation of the reduction gear 233 of each of the joints J1 to J6 of the robot arm 201 also changes. Thus, when the robot arm 201 is operated through the semi-closed loop control which uses the input-side encoder 250, the position of the distal end of the robot arm 201 is displaced from a position of the distal end positioned when the teaching is performed in the steps S101 to S106.

As countermeasures to this, in the first embodiment, the CPU 301 corrects the teaching point information, i.e., the teaching data 323, stored in the HDD 304 so that the posture of the robot arm 201 becomes equal to the posture fixed when the teaching is performed. That is, the CPU 301 overwrites the teaching data 323 stored in the HDD 304. After correcting the teaching data 323, the CPU 301 creates trajectory data by using the corrected teaching data 323, and automatically operates the robot arm 201 in accordance with the trajectory data.

Figure 7:
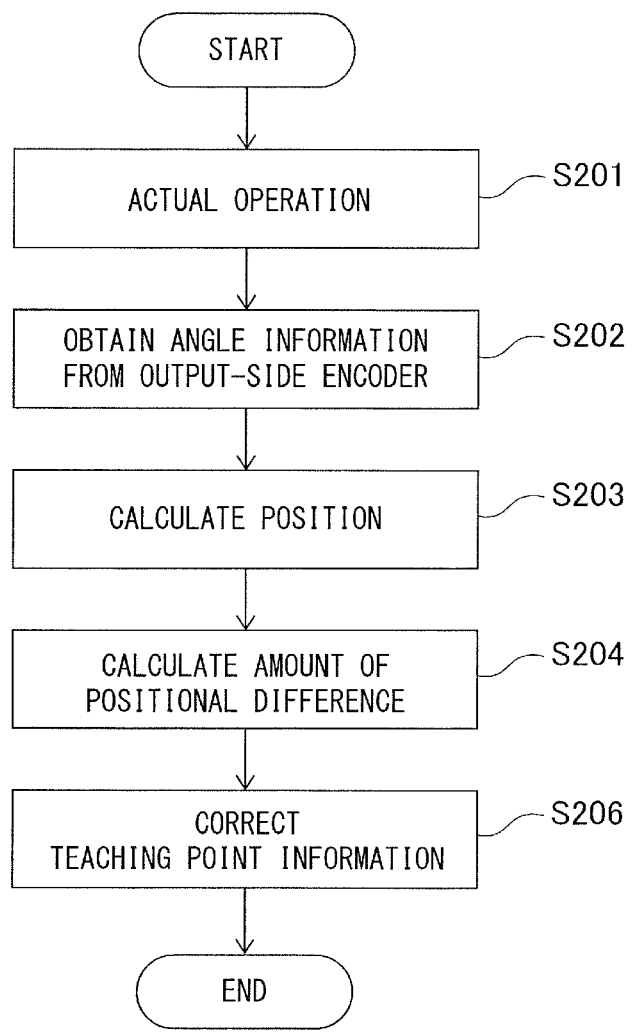
FIG. 7 is a flowchart for illustrating a control method for the robot arm, of the first embodiment.
Figure 8A:
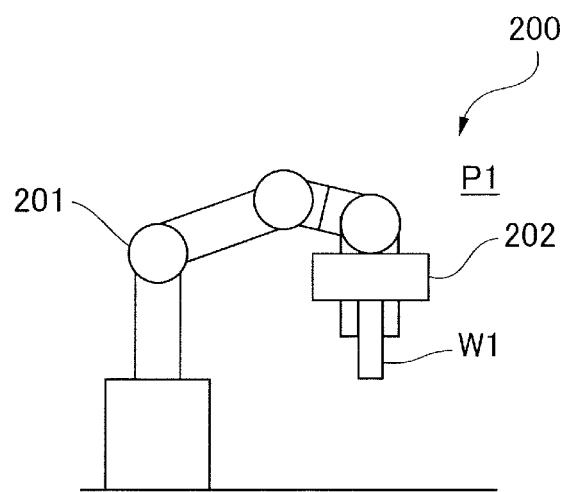
FIG. 8A is a diagram for illustrating an operation of the robot arm of the first embodiment.
Figure 8B:
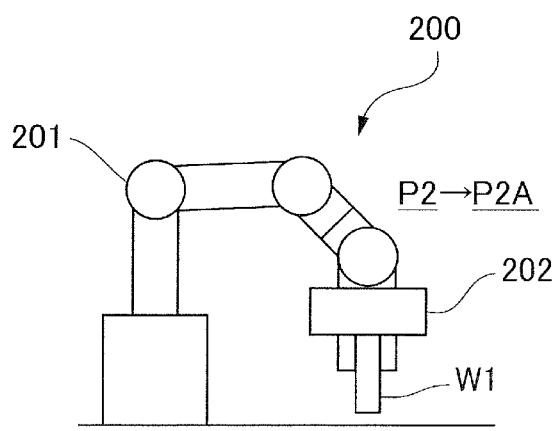
FIG. 8B is a diagram for illustrating an operation of the robot arm of the first embodiment.

Hereinafter, the process to correct the created teaching data 323 will be described. FIG. 6 is a functional block diagram functionally illustrating the control system of the robot system 100 of the first embodiment. FIG. 7 is a flowchart for illustrating a control method for the robot arm 201, of the first embodiment. FIGS. 8A and 8B are diagrams for illustrating operations of the robot arm 201.

The CPU 301 illustrated in FIG. 3 executes the program 321; and thereby functions, as illustrated in FIG. 6, as a command creation unit 601, a first measurement unit 602, a second measurement unit 603, a comparison unit 604, and a correction unit 605. The CPU 301 executes the flow illustrated in FIG. 7. Hereinafter, operations of the command creation unit 601, the first measurement unit 602, the second measurement unit 603, the comparison unit 604, and the correction unit 605 will be described.

The command creation unit 601 reads any one of pieces of teaching point information contained in the teaching data 323, which is stored in the HDD 304; and obtains teaching point information. The command creation unit 601 uses the teaching point information which has been read, determines angle command values (position command values) which indicate angles of the servo motors 231 of the joints, and sends the determined angle command values to the servo control device 350. The servo control device 350 feedback-controls the servo motors 231, depending on differences between the angle command values and output values which are detection results by the input-side encoders 250, so that the detection results become close to the angle command values (determined based on the teaching point information) for the servo motors 231 of the joints J1 to J6. With this operation, the command creation unit 601 causes the servo control device 350 to move the robot arm 201 in accordance with the teaching point information (S201). In this time, the hand 202 does not hold the teaching jig WA, and holds nothing or the workpiece W1. That is, the robot 200 performs actual operation in a state equal or close to a state of actual work. Thus, the command creation unit 601 causes the robot arm 201 to move in accordance with the teaching point information in the state where the robot arm 201 does not support the teaching jig WA.

The first measurement unit 602 receives from the output-side encoder 260 a signal indicating an output value which is angle information (S202). As previously described, this angle information contains displacement information caused by deformation of the reduction gear 233. The second measurement unit 603 determines a position of the distal end of the robot arm 201, as second data on the posture of the robot arm 201, by using the angle information of the joints J1 to J6, through calculation based on forward kinematics of robot (S203). That is, the measurement units 602 and 603 obtain detection results detected by the output-side encoders 260 disposed in the joints J1 to J6, and determine the position of the distal end of the robot arm 201 by using the detection results. Thus, the measurement units 602 and 603 measure the position of the distal end of the robot arm 201, and thereby obtain the second data on the posture of the robot arm 201, as a measurement result (S202, S203: measurement processes). The information on the position of the distal end of the robot arm 201 contains three components indicating a position in the translational directions and three components indicating a position in the rotational directions.

Here, although the position of the distal end of the robot arm 201 is measured by using the plurality of output-side encoders 260 of the robot arm 201, the method of the measurement is not limited to this. For example, a laser displacement gauge, which is one example of measuring instruments, may be disposed around the robot arm 201. In this case, the CPU 301 measures the position of the distal end of the robot arm 201 by using the laser displacement gauge.

The comparison unit 604 determines a difference between the first data and the second data, both on the posture of the robot arm 201. In the present embodiment, the comparison unit 604 reads the reference position information, which is the first data and stored in the HDD 304; and thereby obtains the reference position information. In addition, the comparison unit 604 obtains information on the position of the distal end of the robot arm 201, which is the second data, from the measurement units 602 and 603. Then the comparison unit 604 determines the amount of positional difference which is a difference between the reference position and the position of the distal end of the robot arm 201 measured by the measurement units 602 and 603 (S204). Like the previously-described TCP and teaching point, the amount of positional difference contains six components whose parameters are denoted by ΔX, ΔY, ΔZ, ΔTX, ΔTY, and ΔTZ.

The correction unit 605 corrects the teaching point based on the difference between the first data and the second data on the posture of the robot arm 201. In the present embodiment, the correction unit 605 calculates the amount of correction for the teaching point information based on the amount of positional difference determined by the comparison unit 604. The amount of correction is calculated so that the position of the distal end of the robot arm 201 in actual operation coincides with the position of the distal end of the robot arm 201 determined in the teaching. The correction unit 605 corrects and overwrites the teaching point information stored in the HDD 304 (S206: correction process).

A specific example will be described. A teaching point P1 of FIG. 8A may be with low accuracy, and may not be corrected. A teaching point P2 of FIG. 8B is positioned at a position at which the workpiece W1 is fitted onto the workpiece W2, and is required to have high accuracy and to be corrected. That is, some of the plurality of pieces of teaching point information have only to be processed in the steps S201 to S206.

Hereinafter, the correction of the teaching point P2 will be described. In the present embodiment, when the teaching point P1 precedes the teaching point P2 in the motion of the robot arm 201, the robot arm 201 is moved from the teaching point P1 to the teaching point P2. This is because the reduction gears 233 disposed in the joints J1 to J6 have hysteresis, and thus the robot arm 201 is required to be moved in a state close to a state of actual assembly operation. In addition, as illustrated in FIG. 8B, the workpiece W2, which is illustrated in FIG. 1 and onto which the workpiece W1 is to be fitted, is not disposed so as not to interfere with the workpiece W1.

The teaching point P2, which is still not corrected and serves as a first teaching point, has component parameters X2, Y2, Z2, TX2, TY2, and TZ2. Component parameters of the amount of positional difference are ΔX, ΔY, ΔZ, ΔTX, ΔTY, and ΔTZ. To cancel the amount of positional difference, that is, to reduce the amount of positional difference at the position of the distal end of the robot arm 201, the CPU 301 corrects the teaching point P2 in Step S206, and creates a corrected new teaching point P2A which is a second teaching point. Then the CPU 301 overwrites the teaching point P2 which is not corrected and stored in the HDD 304, with the corrected new teaching point P2A. Specifically, the CPU 301 determines X2−ΔX, Y2−ΔY, Z2−ΔZ, TX2−ΔTX, TY2−ΔTY, and TZ2−ΔTZ, as the new teaching point P2A.

After correcting the teaching point P2 into the teaching point P2A, the CPU 301 creates trajectory data which connects the teaching points P1, P2A, . . . , and causes the HDD 304 to store the trajectory data. After the above-described correction work, the substantial teaching for the robot arm 201 is completed.

When the robot arm 201 is automatically operated, the CPU 301 uses the created trajectory data, which has been corrected. Thus, the CPU 301 does not correct the trajectory data one by one during the feedback control performed by the servo control device 350. Thus, the CPU 301 corrects teaching points themselves during the teaching, and in actual automatic operation, uses trajectory data corrected in advance. As a result, load for computation of the servo control device 350 is reduced, which improves responsivity of robot operation.

The amount of positional difference at the distal end of the robot arm 201 becomes smaller than that in a case where the correction is not performed. As a result, positional accuracy of the distal end of the robot arm 201 is improved, which improves accuracy of actual work. Therefore, in work such as assembly work, which needs to be accurately performed by the robot 200, a ratio of failure in work decreases, allowing the robot 200 to reliably perform predetermined work. In the present embodiment, the description has been made for the case where the teaching point P2 is corrected into the teaching point P2A before the automatic operation of the robot arm 201. The present disclosure, however, is not limited to this. For example, when the robot arm 201 is automatically being operated, that is, when an article is being manufactured by fitting the workpiece W1 onto the workpiece W2, the teaching point P2 may be corrected into the teaching point P2A by obtaining the second data on the posture of the robot arm 201 which supports the workpiece W1.

Second Embodiment

Figure 9:
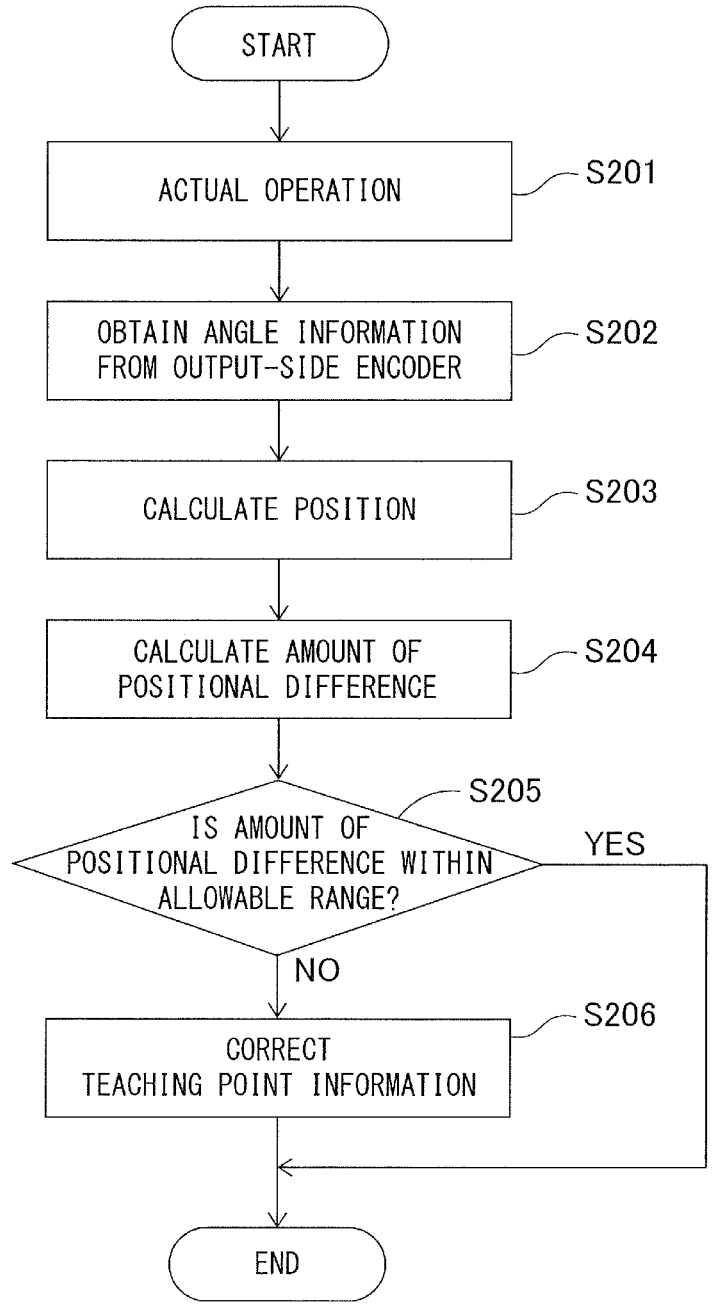
FIG. 9 is a flowchart for illustrating a control method for the robot arm, of a second embodiment.

Next, a control method for the robot arm of the robot system, of a second embodiment will be described. FIG. 9 is a flowchart for illustrating the control method for the robot arm, of the second embodiment. Here, since a configuration of the robot system of the second embodiment is the same as that illustrated in FIGS. 1, 2, 3, and 6 of the first embodiment, the description thereof will be omitted. In addition, since the teaching process in the second embodiment is also the same as that illustrated in FIG. 4 of the first embodiment, the description thereof will be omitted.

In the second embodiment, a correction process by the correction unit 605 illustrated in FIG. 6 differs from that in the first embodiment. That is, the second embodiment differs from the first embodiment in that, as illustrated in FIG. 9, Step S205 is provided between Step S204 and Step S206. The steps S201 to S204 and S206 are the same as those of FIG. 7 of the first embodiment.

The correction unit 605 determines whether the amount of positional difference determined in Step S204 is equal to or smaller than a predetermined amount, that is, within an allowable range (S205). If the amount of positional difference is equal to or smaller than the predetermined amount, that is, within the allowable range (S205: YES), then the correction unit 605 completes the process without correcting the teaching point information. If the amount of positional difference is larger than the predetermined amount, that is, exceeds the allowable range (S205: NO), then the correction unit 605 corrects the teaching point information (S206).

The predetermined amount, or the allowable range can be set by an operator operating the teaching pendant 400 illustrated in FIG. 1. That is, since accuracy depends on work, the operator can set the predetermined amount (allowable range) in accordance with desired accuracy.

Also in the second embodiment, as described in the first embodiment, the amount of positional difference at the distal end of the robot arm 201 contains six displacement components $\Delta X$, $\Delta Y$, $\Delta Z$, $\Delta TX$, $\Delta TY$, and $\Delta TZ$ in the translational directions and the rotational directions. Thus, for determining whether the amount of positional difference is equal to or smaller than the predetermined amount, the correction unit 605 determines whether the displacement components $\Delta X$, $\Delta Y$, $\Delta Z$, $\Delta TX$, $\Delta TY$, and $\Delta TZ$ are respectively equal to or larger than corresponding predetermined values THX, THY, THZ, THTX, THTY, and THTZ. Thus, in the second embodiment, the predetermined amount is constituted by the predetermined values corresponding to the displacement components.

Specifically, the correction unit 605 determines in Step S205 that all the six displacement components are equal to or larger than the corresponding predetermined values. The correction unit 605 completes the process if all the six displacement components are equal to or smaller than the corresponding predetermined values (S205: YES), and corrects the teaching point information in Step S206 if at least one of the six displacement components is larger than a corresponding predetermined value (S205: NO). That is, if at least one of the six displacement components exceeds a corresponding predetermined value, the correction unit 605 corrects the teaching point information in Step S206. Alternatively, in Step S205, the correction unit 605 may determine whether an average of the plurality of displacement components, contained in the amount of positional difference, is equal to or smaller than a predetermined value. Here, when the average is calculated, there may be averaged displacement components having the same system of units. For example, the correction unit 605 may determine whether an average of the displacement components $\Delta X$, $\Delta Y$, and $\Delta Z$ is equal to or smaller than a predetermined value, and/or whether an average of the displacement components $\Delta TX$, $\Delta TY$, and $\Delta TZ$ is equal to or smaller than a predetermined value. Here, although the description has been made for the case where the amount of positional difference at the distal end of the robot arm 201 is determined, there may be determined the amount of positional difference containing displacement components of angles of the joints J1 to J6 of the robot arm 201. In this case, the correction unit 605 may determine whether all the six displacement components are respectively equal to or smaller than corresponding predetermined values, or whether an average of the six displacement components is equal to or smaller than a predetermined value.

Also in the second embodiment, as in the first embodiment, the amount of positional difference at the distal end of the robot arm 201 becomes smaller than that in a case where the correction is not performed. As a result, teaching accuracy for the robot arm 201 is improved, which improves accuracy of actual work. Therefore, in work such as assembly work, which needs to be accurately performed by the robot 200, a ratio of failure in work decreases, allowing the robot 200 to reliably perform predetermined work.

Third Embodiment

Figure 10:
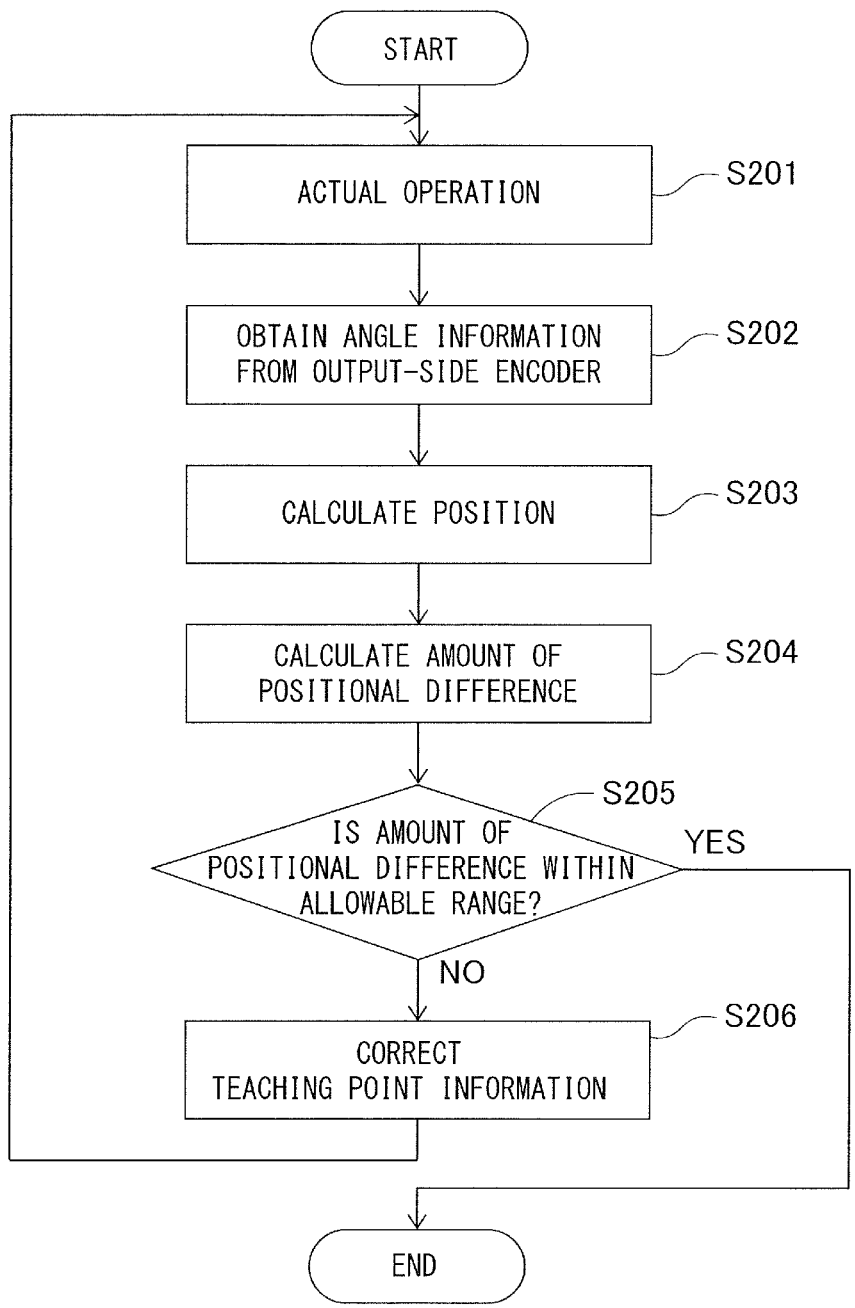
FIG. 10 is a flowchart for illustrating a control method for the robot arm, of a third embodiment.

Next, a control method for the robot arm of the robot system, of a third embodiment will be described. FIG. 10 is a flowchart for illustrating the control method for the robot arm, of the third embodiment. Here, since a configuration of the robot system of the third embodiment is the same as that illustrated in FIGS. 1, 2, 3, and 6 of the first embodiment, the description thereof will be omitted. In addition, since the teaching process in the third embodiment is also the same as that illustrated in FIG. 4 of the first embodiment, the description thereof will be omitted.

As illustrated in FIG. 10, the third embodiment differs from the second embodiment in that the steps S201 to S206 are repeated. The steps S201 to S206 are the same as those of FIG. 9 of the second embodiment.

The correction unit 605 determines whether the amount of positional difference determined in Step S204 is equal to or smaller than a predetermined amount, that is, within an allowable range (S205). If the amount of positional difference is equal to or smaller than the predetermined amount, that is, within the allowable range (S205: YES), then the correction unit 605 completes the process without correcting the teaching point information. If the amount of positional difference is larger than the predetermined amount, that is, exceeds the allowable range (S205: NO), then the correction unit 605 corrects the teaching point information (S206). Then the CPU 301 returns to Step S201, and repeats the steps S201 to S206. That is, the CPU 301 repeats the steps S201 to S206 until the amount of positional difference falls within the allowable range. In the example of FIG. 8B, the CPU 301 repeatedly corrects the teaching point P2 to create the teaching point P2A until the amount of positional difference falls within the allowable range. This process can increase the teaching accuracy for the robot arm 201 more than the second embodiment.

Fourth Embodiment

Figure 11:
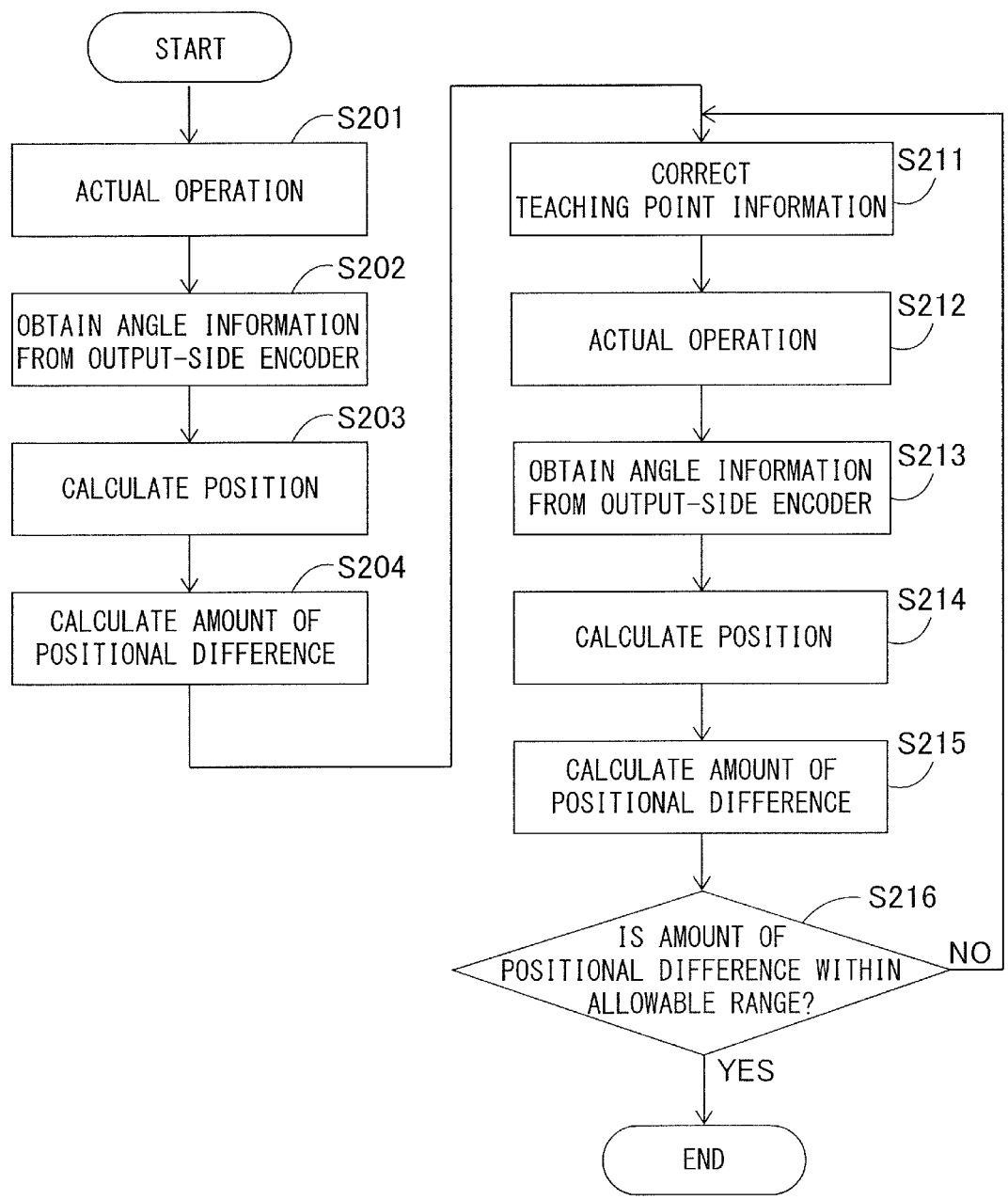
FIG. 11 is a flowchart for illustrating a control method for the robot arm, of a fourth embodiment.

Next, a control method for the robot arm of the robot system, of a fourth embodiment will be described. FIG. 11 is a flowchart for illustrating the control method for the robot arm, of the fourth embodiment. Here, since a configuration of the robot system of the fourth embodiment is the same as that illustrated in FIGS. 1, 2, 3, and 6 of the first embodiment, the description thereof will be omitted. In addition, since the teaching process in the fourth embodiment is also the same as that illustrated in FIG. 4 of the first embodiment, the description thereof will be omitted.

As illustrated in FIG. 11, in the fourth embodiment, the CPU 301 illustrated in FIG. 3 executes the steps S201 to S204, and then executes a process equal to Step S206 of FIG. 7, in step S211. Then the CPU 301 executes processes equal to the steps S201 to S204, in steps S212 to S215. Then the CPU 301 executes a process equal to the step S205 of FIG. 9, in Step S216.

The CPU 301 returns to Step S211 if the amount of positional difference exceeds a predetermined amount, that is, exceeds the allowable range (S216: NO), or completes the process if the amount of positional difference is equal to or smaller than the predetermined amount, that is, within the allowable range (S216: YES).

In this manner, in the fourth embodiment, the CPU 301 corrects the teaching point in the first procedure, regardless of the amount of positional difference. In the second or more procedures, the CPU 301 corrects the teaching point if the amount of positional difference exceeds a predetermined amount. Also in the fourth embodiment, as in the first embodiment, the amount of positional difference at the distal end of the robot arm 201 becomes smaller than that in a case where the correction is not performed. As a result, teaching accuracy for the robot arm 201 is improved, which improves accuracy of actual work. Therefore, in work such as assembly work, which needs to be accurately performed by the robot 200, a ratio of failure in work decreases, allowing the robot 200 to reliably perform predetermined work.

The present invention is not limited to the above-described embodiments, and may be variously modified within the technical concept of the present invention. In addition, the effects described in the embodiments are merely the most suitable effects produced by the present invention. Thus, the effects by the present invention are not limited to those described in the embodiments.

Although the description has been made in the above embodiments for the case where the robot is a vertically articulated robot, the robot may be a horizontally articulated robot (SCARA robot) or a parallel link robot.

In addition, although the description has been made in the above embodiments for the case where the robot control device 300 serves also as a teaching device and creates data on the teaching point P2 and the first data on the posture of the robot arm 201 moved to the teaching point P2. The present disclosure, however, is not limited to this. For example, the teaching device and the robot control device 300 may be computers separated from each other. That is, a computer different from the robot control device 300 may create the data on the teaching point P2 and the first data on the posture of the robot arm 201 moved to the teaching point P2. In this case, the robot control device 300 may obtain the created data on the teaching point P2 and the first data on the posture of the robot arm 201 moved to the teaching point P2, from the external storage device 600 or the communication network 700 illustrated in FIG. 3.

In addition, in the above embodiments, the description has been made for the case where the position of the distal end of the robot arm 201 is determined as the first and the second data on the posture of the robot arm 201. The present disclosure, however, is not limited to this. For example, data on positions of the joints J1 to J6 of the robot arm 201 in the translational or the rotational directions may be determined as the first and the second data on the posture of the robot arm 201. Specifically, the data on positions of the joints J1 to J6 of the robot arm 201 in the translational or the rotational directions may be determined by using output values from the output-side encoders 260 disposed in the joints J1 to J6.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-004451, filed Jan. 15, 2018, and Japanese Patent Application No. 2018-215392, filed Nov. 16, 2018, which are hereby incorporated by reference herein in their entirety.

What is claimed is:

1. A robot system comprising:
a robot arm; and
a controller configured to control posture of the robot arm, wherein the controller is configured to:
obtain a first teaching point created in a state where the robot arm is supporting a tool other than a workpiece to be supported by the robot arm, and first data on posture of the robot arm determined when the first teaching point is created;
move the robot arm in accordance with the first teaching point in a state where the robot arm is supporting the workpiece or nothing, and obtain second data on posture of the robot arm determined when the robot arm has been moved in accordance with the first teaching point; and
create a second teaching point by correcting the first teaching point based on the first data and the second data.

2. The robot system according to claim 1, wherein the tool is a teaching jig or a camera.

3. The robot system according to claim 1, wherein the controller obtains the first teaching point and the first data from an outside.

4. The robot system according to claim 1, wherein the robot arm comprises a motor and a reduction gear configured to move a joint by reducing rotation output from the motor.

5. The robot system according to claim 4, wherein the robot arm comprises a first encoder disposed on an output side with respect to the reduction gear, and
wherein the controller determines the second data based on an output value from the first encoder.

6. The robot system according to claim 4, wherein the robot arm comprises a second encoder disposed on an input side with respect to the reduction gear, and
wherein, when obtaining the second data, the controller feedback-controls the motor for motion of the robot arm so that an output value from the second encoder becomes close to a command value determined based on the first teaching point.

7. The robot system according to claim 1, wherein the first teaching point is included in a plurality of teaching points used to cause the robot arm to perform a series of operations.

8. The robot system according to claim 1, wherein the controller is configured to create a second teaching point by correcting the first teaching point based on a difference between the first data and the second data.

9. The robot system according to claim 8, wherein each of the first data and the second data contains data on a position of a distal end of the robot arm.

10. The robot system according to claim 8, wherein the controller creates the second teaching point by repeatedly correcting the first teaching point until a difference between the first data and the second data is equal to or smaller than a predetermined amount.

11. The robot system according to claim 9, wherein the difference between the first data and the second data contains components indicating a position at the distal end of the robot arm in translational directions and components indicating a position at the distal end of the robot arm in rotational directions, and wherein the controller creates the second teaching point by repeatedly correcting the first teaching point until each of the components indicating the position in the translational directions and the components indicating the position in the rotational directions is equal to or smaller than a predetermined corresponding value.

12. A method of controlling a robot arm, comprising:

obtaining a first teaching point created in a state where the robot arm is supporting a tool other than a workpiece to be supported by the robot arm, and first data on posture of the robot arm determined when the first teaching point is created;

moving the robot arm in accordance with the first teaching point in a state where the robot arm is supporting the workpiece or nothing, and obtaining second data on posture of the robot arm determined when the robot arm has been moved in accordance with the first teaching point; and creating a second teaching point by correcting the first teaching point based on the first data and the second data.

13. A non-transitory computer-readable recording medium storing a program that causes a computer to perform the method according to claim 12.

14. A method of using a robot arm and manufacturing an article in which a first workpiece is fitted on a second workpiece, the method comprising:

obtaining a first teaching point created in a state where the robot arm is supporting a tool other than the first workpiece to be supported by the robot arm, and first data on posture of the robot arm determined when the first teaching point is created;

moving the robot arm in accordance with the first teaching point in a state where the robot arm is supporting the first workpiece, and obtaining second data on posture of the robot arm determined when the robot arm has been moved in accordance with the first teaching point;

creating a second teaching point by correcting the first teaching point based on the first data and the second data; and moving the robot arm in accordance with the second teaching point, and fitting the first workpiece onto the second workpiece.

* * * * *